United States Patent … US 8,027,440 B2
Brady et al. … Sep. 27, 2011

(54) SYSTEM AND METHOD FOR FACILITATING CALL ROUTING

(75) Inventors: Paul J. Brady, Windsor, CT (US); Elias Berelian, Stratford, CT (US); Jackie A. Halpern, Oxford, CT (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 2753 days.

(21) Appl. No.: 10/217,795

(22) Filed: Aug. 13, 2002

(65) Prior Publication Data

US 2004/0032937 A1   Feb. 19, 2004

(51) Int. Cl.
H04M 15/00 (2006.01)
H04M 7/00 (2006.01)
H04W 40/00 (2009.01)

(52) U.S. Cl. ......... 379/115.03; 379/115.01; 379/221.14; 455/445

(58) Field of Classification Search ........... 379/219, 379/220.01, 221.01, 221.02, 221.08, 221.14, 379/222, 229, 114.02, 115.01, 115.02, 115.03, 379/121.01, 128; 455/445
See application file for complete search history.

(56) References Cited

U.S. PATENT DOCUMENTS

| | | | |
|---|---|---|---|
| 5,333,185 A | 7/1994 | Burke et al. | 379/127 |
| 5,506,894 A | 4/1996 | Billings et al. | 379/127 |
| 5,537,467 A | 7/1996 | Cheng et al. | 379/211 |
| 5,661,792 A | 8/1997 | Akinpelu et al. | 379/221 |
| 5,722,088 A | 2/1998 | Storn et al. | 455/564 |
| 5,764,749 A * | 6/1998 | Zelazny et al. | 379/221.02 |
| 5,892,822 A | 4/1999 | Gottlieb et al. | 379/220 |
| 5,903,638 A * | 5/1999 | Welter et al. | 379/221.02 |
| 5,905,791 A * | 5/1999 | Goel et al. | 379/211.02 |
| 5,917,897 A | 6/1999 | Johnson et al. | 379/114 |
| 5,937,053 A | 8/1999 | Lee et al. | 379/220 |
| 5,943,411 A | 8/1999 | Houck et al. | 379/219 |
| 6,011,795 A | 1/2000 | Varghese et al. | 370/392 |
| 6,052,457 A | 4/2000 | Abdelaal et al. | 379/220 |
| 6,078,656 A | 6/2000 | Sonnenberg | 379/219 |
| 6,097,801 A | 8/2000 | Williams et al. | 379/207 |

(Continued)

FOREIGN PATENT DOCUMENTS

AU   9859462   10/1998

OTHER PUBLICATIONS

PCT Search Report for PCT/US04/01215, 9 pgs, Mailed Aug. 2, 2004.

(Continued)

Primary Examiner — Quoc D Tran
(74) Attorney, Agent, or Firm — Jackson Walker L.L.P.

(57) ABSTRACT

A telecommunications system utilizes a central database to determine characteristics for international calls, to facilitate call routing for international calls, or both. The central database includes termination information for telephone numbers in multiple nations outside the North American Numbering Plan. In one aspect, an interexchange switch receives a termination number for an international call from a local exchange carrier and uses information from the central database to help complete the call. In another aspect, the central database receives a telephone number from a remote user such as interexchange carrier (IXC) and, in response, transmits termination information to the remote user to identify whether the telephone number uses wireless termination. The remote user may then charge a customer for wireless termination, if appropriate, possibly even before the remote user receives an invoice that reflects wireless termination charges from a foreign wireless carrier.

15 Claims, 3 Drawing Sheets

U.S. PATENT DOCUMENTS

| | | | | |
|---|---|---|---|---|
| 6,104,701 | A | 8/2000 | Avargues et al. | 370/238 |
| 6,108,332 | A | 8/2000 | Kasiviswanathan | 370/360 |
| 6,134,316 | A | 10/2000 | Kallioniemi et al. | 379/220 |
| 6,192,115 | B1 | 2/2001 | Toy et al. | 379/130 |
| 6,240,293 | B1 | 5/2001 | Koster | 455/445 |
| 6,301,477 | B1 | 10/2001 | Lennert et al. | 455/433 |
| 6,314,288 | B1 | 11/2001 | Murdock-Armstrong | 455/426 |
| 6,324,277 | B1 | 11/2001 | Akinpelu et al. | 379/221 |
| 6,332,019 | B1 | 12/2001 | Morley et al. | 379/88.23 |
| 6,381,315 | B1* | 4/2002 | Nhaissi | 379/111 |
| 6,449,497 | B1 | 9/2002 | Kirbas et al. | 455/564 |
| 6,570,973 | B1 | 5/2003 | Boughman et al. | 379/207.02 |
| 6,587,688 | B1* | 7/2003 | Chambers et al. | 455/433 |
| 6,611,587 | B2* | 8/2003 | Brown et al. | 379/221.14 |
| 6,639,978 | B2 | 10/2003 | Draizin et al. | 379/114.21 |
| 6,674,850 | B2 | 1/2004 | Vu et al. | 379/220.01 |
| 6,718,025 | B2 | 4/2004 | Boughman et al. | 379/207.02 |
| 6,748,064 | B2* | 6/2004 | Zbib | 379/114.02 |
| 6,847,707 | B1* | 1/2005 | Suda et al. | 379/114.01 |
| 7,602,891 | B2* | 10/2009 | Halpern et al. | 379/115.03 |
| 2002/0112014 | A1* | 8/2002 | Bennett et al. | 709/206 |
| 2002/0131578 | A1 | 9/2002 | Yamartino | 379/355.08 |
| 2003/0190037 | A1 | 10/2003 | Hruska | 379/355.01 |
| 2004/0085953 | A1 | 5/2004 | Davis | 370/356 |
| 2004/0203650 | A1* | 10/2004 | Halpern et al. | 455/414.1 |

OTHER PUBLICATIONS

John L Guerra, "*U.S. Carriers Lose Revenue on International Wireless Termination*", Billing World and OSS Today Magazine, at internet address <http://www.billingworld.com/archive-detail.cfm?archiveId=5564&hl=U%2ES%2E%3ACa...>, 3 Pages, Apr. 2002.

AT&T Call Servicing: Routing Data, "*Operating Rate/Route Guides & Reports*", at internet address <http://www.sea.att.com/ocs/extranet/authorize/routing>. 1 Page, Printed May 16, 2002.

AT&T Call Servicing: Routing Data: IORRG, "What is the IORRG?", at internet address <http://www.sea.att.com/ocs/extranet/authorize/routing/iorrg/index.htm>. 1 Page, Printed May 16, 2002.

SpraakMaker Telecom's International Numbering Plans, "*Welcome to Numberingplans.com!*", at Internet address <http://www.numberingplans.com/>. 1 Page, Printed May 16, 2002.

SpraakMaker Telecom's International Numbering Plans, "*Premium Database Access*", at Internet address <http://www.numberingplans.com/index.php3?goto=help&topic=premiumaccess>. 3 Pages, Printed May 16, 2002.

SpraakMaker Telecom's International Numbering Plans, "*Download numbering plan databases*", at internet address <http://www.numberingplans.com/index.php3?goto=article1>. 1 Page, Printed May 16, 2002.

SpraakMaker Telecom's International Numbering Plans, "*Analyze telephone numbers on-line*", at Internet address <http://www.numberingplans.com/index.php3?goto=article2>. 2 Pages, Printed May 16, 2002.

SpraakMaker Telecom's International Numbering Plans, "*Number Analysis*", at Internet address <http://www.numberingplans.com/index.php3?goto=help&topic=numberanalysis>. 3 Pages, Printed May 16, 2002.

AT&T Call Servicing: Routing: XTPM, "*XTPM Reports and Information*", at internet address <http://www.sea.att.com/ocs/extranet/authorize/routing/xtpm/index.htm>. 1 Page, Printed May 16, 2002.

Arbinet-theexchange's, "*AXCESSCODE$^{SM}$*", at internet address <http://www.axcesscode.com>. 2 Pages, Printed May 16, 2002.

Band-X Homepage at Internet address <http://www.band-x.com/en/>. 2 Pages, Printed May 16, 2002.

Arbinet-thexchange Homepage at internet address <http://www.thexchange.com/>. 1 Page, Printed May 16, 2002.

International Telecommunication Union, "*National Numbering Plan*", at internet address <http://www.itu.int/ITU-T/inr/nnp/index.html>. 5 Pages, Printed May 16, 2002.

Telecom.paper—Numbercodes at Internet address <http://www.numbercodes.com/>. 2 Pages, Printed May 16, 2002.

NeuStar Inc.'s "North American Numbering Plan Administration (NANPA)", at internet address <http://www.nanpa.com> 1 Page, Printed Jul. 23, 2002.

"SNET Looks to Plug Billion-dollar International Sieve", ASCENT Show Daily 1 Page, May 22, 2002.

* cited by examiner

Destination Number
011 33 1 43 12 22 22

PREFIX TABLE

| Destination Code | Desc. Code |
|---|---|
| 98 21 | IWMTS12345 |
| ⋮ | ⋮ |
|  |  |
|  |  |

LOCATION TABLE

| Desc. Code | Location |
|---|---|
| IWMTS12345 | France-Paris |
| FWXYZ22345 | France-Wireless (Acme) |
| ⋮ | ⋮ |
|  |  |

TRANSLATION TABLE

| Desc. Code | Customer ID | CTC1 | CTC2 | CTC3 |
|---|---|---|---|---|
| IWMTS12345 | 250 84 10 | 654321 | 754321 | 654322 |
| ⋮ | ⋮ | ⋮ | ⋮ | ⋮ |
| | | | | |
| | | | | |

- Begin
- 60 — Receive Login Request
- 62 — Authenticate Customer
- 64 — Retrieve Customer ID
- 70 — Receive Query with Destination Number
- 72 — Lookup Desc. Code in Prefix Table
- 74 — Lookup Termination Information
- 76 — Determine Whether Carrier is Wireless
- 80 — Return Result to User
- 96 — Logout Requested? NO / YES

SYSTEM AND METHOD FOR FACILITATING CALL ROUTING

TECHNICAL FIELD OF THE INVENTION

The present invention relates in general to communications systems and, in particular, to a system, a method, and a program product for facilitating call routing for international calls.

BACKGROUND OF THE INVENTION

In the United States of America, wireless carriers typically do not charge wireline carriers a per-minute charge for carrying their calls. Instead, wireless carriers in the United States typically charge the wireless subscribers for both incoming and outgoing calls. Outside of the United States, however, wireless carriers typically impose per-minute charges for terminating calls to wireless telephone numbers. Those charges may be referred to as wireless termination charges, and the practice of imposing wireless termination charges may be referred to as wireless carrier access billing (CAB).

Currently, carriers of international calls are unable to determine, in advance of customer billing, whether an international call has been terminated to a wireless or wireline number, and if wireless, which carrier. Consequently, international carriers are unable to bill customers appropriately, and international carriers are estimated to be losing approximately one billion dollars per year in revenue as a result of these inabilities. They are also unable to route calls directly to the correct wireless carrier, increasing their transport expenses.

BRIEF DESCRIPTION OF THE DRAWINGS

A more complete understanding of the present invention and advantages thereof may be acquired by referring to the appended claims, the following description of one or more example embodiments, and the accompanying drawings, in which:

FIG. 5 depicts an example embodiment of a translation table from the central database of FIG. 1;

FIG. 6 depicts a flowchart of an example embodiment of a process, within the centralized database of FIG. 1, for identifying countries, cities, and wireless carriers.

DETAILED DESCRIPTION OF EXAMPLE EMBODIMENT(S)

In the United Stated, telephone numbers for terminations within the public switched telephone network (PSTN) are allocated among carriers according to the North American Numbering Plan (NANP). The Local Exchange Routing Guide (LERG) involves a collection of data that describes the carriers in the United States and the telephone numbers assigned to those carriers. In the United States, local exchange carriers (LECs) and interexchange carriers (IXCs) typically derive local exchange routing guides from the data in the LERG. The carriers store the local exchange routing guides in routing switches, and those switches use the local exchange routing guide to route toll calls within the United States. For international calls, however, carriers in the United States typically cannot determine which carrier owns the number being called. Furthermore, carriers in the United States typically cannot determine whether a called number uses wireline or wireless termination. As described above, this lack of information makes it difficult or impossible for carriers in the United States to bill appropriately for international calls to wireless numbers, and substantial amounts of potential revenue are lost each year as a result. A lack of information about numbers outside the NANP also results in losses caused by inefficient call routing.

This document describes an example embodiment of a system and related methods for identifying wireless terminations and carriers for international calls and facilitating efficient routing for international calls. As described in greater detail below, the disclosed system uses a centralized database of information relating to international terminations. In one aspect, switches automatically use the centralized database, during the process of call completion, to obtain information for use in completing the call. In another aspect, carriers use the centralized database to obtain information about wireless termination for purposes of producing appropriate customer bills after the calls are completed. Various components in the example embodiment are introduced below, followed by a description of how those components may work together to help route international calls and identify wireless carriers for international calls.

Figures 1, 2, 3, 4:
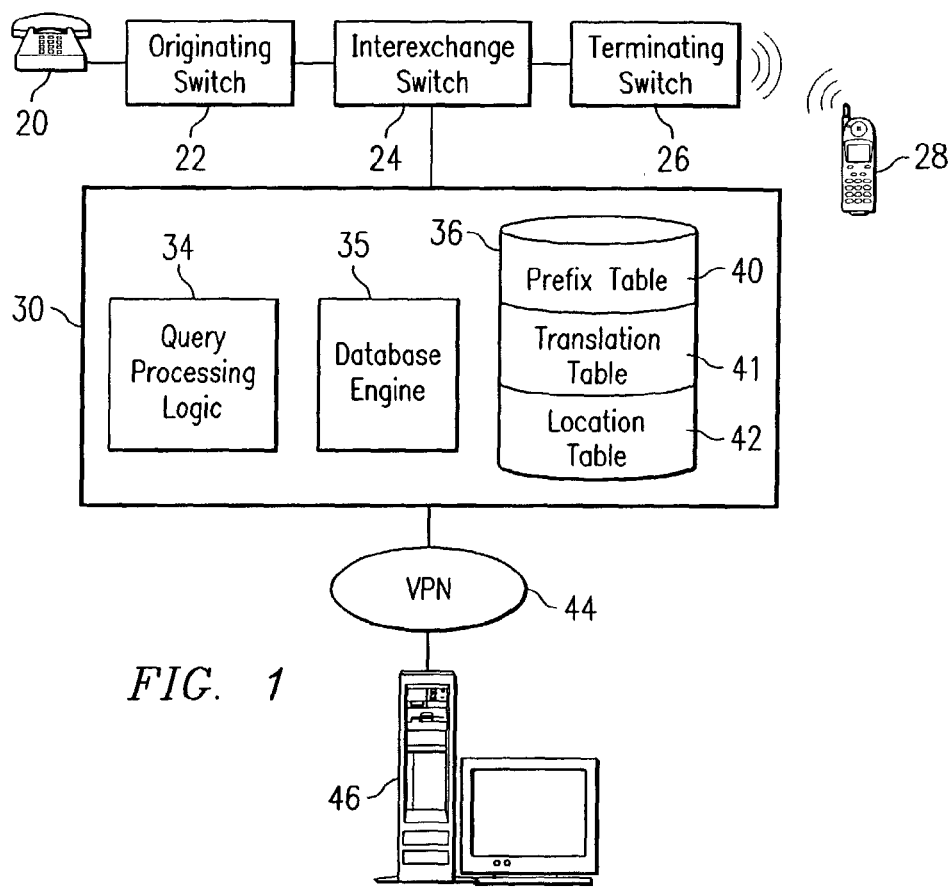
FIG. 1 depicts a block diagram of an example embodiment of a system for identifying wireless carriers and facilitating call routing.
FIG. 2 depicts an example embodiment of a destination number for a telephone call to be routed through the system of FIG. 1.
FIG. 3 depicts an example embodiment of a prefix table from the central database of FIG. 1.
FIG. 4 depicts an example embodiment of a location table from the central database of FIG. 1.

FIG. 1 depicts a block diagram of an example embodiment of a system for identifying wireless carriers and facilitating call routing. In the illustrated system, a caller at a telephone 20 in the United States may connect to a wireless telephone 28 in a foreign country (e.g., France) via various switches. Those switches may include an originating switch 22 operated by an originating LEC, an interexchange switch 24 operated by an IXC or backbone provider, and a terminating switch 26 operated by a foreign carrier. LECs, IXCs, backbone providers, foreign carriers, and other organizations involved in providing telecommunications services may be referred to as telecommunication service providers or simply service providers or phone companies.

As described in greater detail below, interexchange switch 24 may communicate with a remote central database 30 to obtain information to help with call completion. In addition or alternatively, as also described below, the IXC or an operator services provider may use a workstation 46 to obtain information from centralized database 30 via a network channel such as a private connection with dedicated lines or a virtual private network (VPN) 44. The processing resources within workstation 46 and interexchange switch 24, may include any appropriate collection of software and hardware components, such as central processing units (CPUs), application specific integrated circuits (ASICs), input/output (I/O) units, memory such as random access memory (RAM), non-volatile (NV) data storage devices such as one or more disk drives 36 or NVRAM, and other components. The software in central database 30 may include control logic such as query processing logic 34 and database engine 35 for processing requests for information. Central database 30 may also include various tables for storing information, such as a prefix table 40, a translation table 41, and a location table 42. For instance, the tables may be used to store termination type (e.g., wireless or wireline), location identifiers (e.g., national prefixes or country codes, area or city codes, etc.), carrier names or identifiers, other types of information pertaining to foreign carriers, and other types of information pertaining to terminations, routing, etc. Such information may also be referred to in general as termination characteristics or termination information.

FIG. 2 depicts an example destination number for an international telephone call that may be routed through the system of FIG. 1. As entered by a caller in North America, that number may include up to 18 digits, including three digits (011) to signify an international call, one to three digits for a country code (e.g., 33 for France), one to seven digits for a city code (e.g., 1 for Paris), and up to 8 digits for the base number for the subscriber being called (e.g., 43 12 22 22 for the American Embassy in Paris).

FIG. 3 depicts prefix table 40 in greater detail, showing a destination code column and a descriptive code column to illustrate that prefix table 40 associates destination codes such as international prefixes with respective descriptive codes. In the example embodiment, each destination code corresponds to one or more international telephone numbers, and the corresponding descriptive code represents the link to the location table for those international telephone numbers. For instance, the destination code may be a string of digits up to fifteen characters long, and those characters or digits may include the telephone number prefixes that are assigned to a particular city or wireless carrier. For instance, the telephone number for the American Embassy in Paris, France is "33 1 43 12 22 22," and the city for that number may also be the city for all telephone numbers with the prefix "33 1 43." Central database 30 may therefore store the prefix "33 1 43" as a destination code, in association with a descriptive code for that city. Accordingly, central database 30 may also be referred to as a centralized prefix database.

In the example embodiment, a linked list may be used to implement prefix table 40. For example, database engine 35 may store the descriptive codes in a doubly-linked list of nodes, with each node featuring a value field, a pointer to a parent node, and ten pointers to child nodes. Furthermore, database engine 35 may utilize the child node pointers to represent the digits in the destination code. Consequently, database engine 35 may forego storing data values for the destination code. Instead, to perform an operation such as a longest prefix match, database engine 35 may traverse the appropriate child pointers to store or retrieve the descriptive code for a given destination code.

The descriptive code may be a string of ten characters and, in addition to serving as a link, the descriptive code may encode characteristics of the prefix, such as the names of the city and country for the prefix, whether the prefix is associated with a wireline or wireless termination, etc.

FIG. 4 depicts location table 42 in greater detail. In the example embodiment, the columns in location table 42 may include a descriptive code column and a location column with data that describes characteristics associated with the prefix, such as the name of the country, the name of the city, a wireless designation, if appropriate, and a carrier name, if available. For example, a prefix with wireline termination in Paris, France may be represented in location table 42 as "France-Paris." On the other hand, a prefix with wireless termination in Paris, France may be represented as "France-Wireless (Acme)" (where "Acme" is the name of the wireless carrier, if available).

In addition, the database may contain termination information for individual carriers for use in routing calls. The termination information may include routing codes that describe routing preferences. In the example embodiment, at least some of those routing codes may be stored in translation table 41. In addition, central database 30 may store a separate set of routing codes in translation table 41 for each originating carrier, and each originating carrier may be allowed to customize termination routing for each foreign terminating city or carrier. Consequently, the stored routing codes may be referred to as custom termination codes (CTCs).

FIG. 5 depicts translation table 41 in greater detail. In the example embodiment, the columns in translation table 41 may include a descriptive code column, a customer identification (ID) column, and three CTC columns. Central database 30 may use translation table 41 to store a set of three translations or CTCs in association with both a carrier code and a customer ID. As described in greater detail below with reference to FIG. 6, customers may customize their CTCs as desired to facilitate call routing, carrier identification, or both. For example, CTCs may be used to store or encode identifiers for different potential communications channels for routing or to store other routing or termination characteristics.

FIG. 6 depicts a flowchart of an example embodiment of a process, within the centralized database of FIG. 1, for identifying country names, city names, and type of termination, with wireless carrier name where available, based on destination numbers. For example, the illustrated process may provide for interaction between a billing application or a directory assistance application with central database 30. The process begins with central database 30 populated with information about terminating numbers in multiple nations, and with query processing logic 34 waiting to receive requests for information from customers. At block 60, database 30 may receive a login request from a customer at workstation 46. The customer may be an IXC in the United States, for instance. At blocks 62 and 64, central database 30 may obtain authentication from the customer and may retrieve a customer ID for the customer. A query that is launched over the Web or VPN 44 may require a login name and password.

At block 70, query processing logic 34 may then receive a request from workstation 46 for termination information, with the request specifying the international telephone number for which termination information is desired. In response, query processing logic 34 may use database engine 35 to perform a longest prefix match on the termination telephone number to retrieve, from prefix table 40, the descriptive code associated with the given termination number, as indicated at block 72. At block 74, central database 30 may then retrieve the corresponding termination information from location table 42. For instance, that termination information may include a country name and a city name for the termination number, or the termination information may include a country name and wireless information for the termination number, such as a wireless designation and possibly the name of the wireless carrier. If location table 42 contains multiple items that correspond to the descriptive code, central database 30 may retrieve multiple items of termination information.

At block 76, database 30 may determine whether the termination number uses wireless termination, based on the wireless information for the termination number. At block 80, database 30 may then return a response or result to workstation 46. That response may include the country name, the city name, a string, code, or flag indicating whether the foreign carrier is a wireless carrier, and a carrier name if the termination is wireless. If there were multiple items corresponding to the descriptive code, database 30 may return multiple responses to the query, for example identifying multiple cities that share the same prefix.

Database 30 may then determine whether the customer is ready to logout, as shown at block 96. If so, the secure connection to the customer may be terminated, and the process may return to block 60 to handle subsequent customer login requests. If the customer is not logging out, the process may return to block 70 to receive additional requests from the current customer.

Thus, customers such as IXCs may use central database 30 to determine whether wireless termination is used for particular international telephone numbers. In addition, customers may use central database 30 to store and automatically retrieve custom routing codes for foreign cities or for termination numbers or prefixes.

In an alternative embodiment, a customer request to central database 30 may include a list of numbers, and query processing logic 34 may return a reply that indicates which of those numbers use wireless termination. For instance, the customer may submit a request containing call detail records for a particular subscriber, and the customer may obtain the termination information from central database 30 when preparing a bill for the subscriber, to include surcharges for wireless termination where appropriate. Consequently, a carrier can produce appropriate bills for its customers without waiting for invoices from upstream providers to know when a number used wireless termination. For purposes of this document, the term "surcharge" includes any additional charge that may be imposed, including flat fees, rates over time, etc.

Query processing logic 34 and the software in workstation 46 may be designed to work together to allow only authorized customers to access information in central database 30 and to control what information each customer receives. For instance, the software in workstation 46 may be designed to facilitate directory assistance or operator assistance, and that software may further provide information about wireless foreign carriers obtained from central database 30 via a private network or VPN 44.

Figure 7:
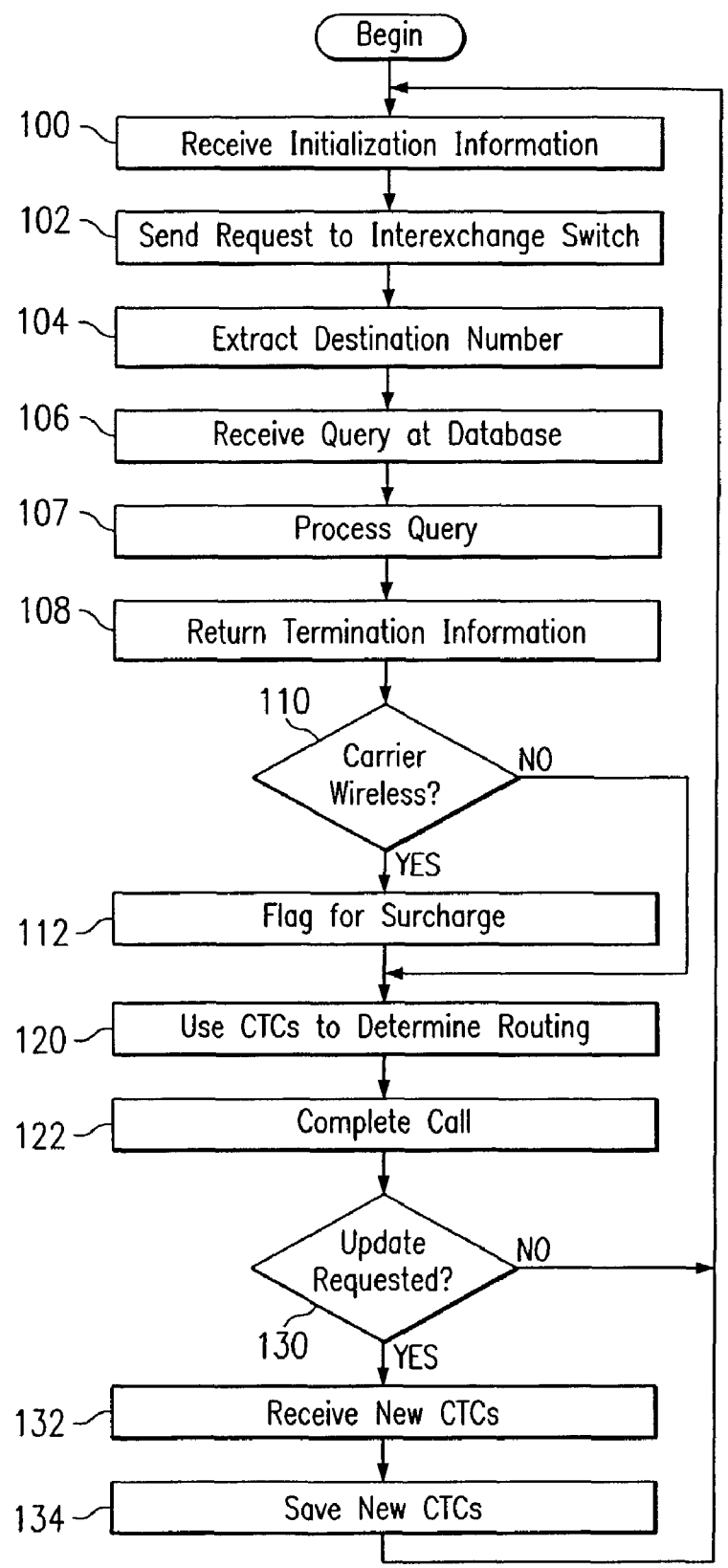
FIG. 7 depicts a flowchart of an example embodiment of a process for facilitating call routing.

In another aspect of the example embodiment, central database 30 may be used to facilitate routing of international calls. FIG. 7 depicts a flowchart of an example embodiment of a process for facilitating routing of international calls. The illustrated process begins with central database 30 already populated with information about foreign wireless carriers, corresponding CTCs, etc., as described above. In the example embodiment, the stored information includes characteristics for telephone numbers outside the NANP.

At block 100, originating switch 22 receives initialization information for an international call from a customer. The initialization information may include the dialed number, such as "011 33 1 43 12 22 22." In response, at block 102, originating switch 22 may automatically send a request with the terminating number to interexchange switch 24, and originating switch 22 may recognize one or more additional call attributes, such as the time of day the call is being made.

In response to receiving the request, interexchange switch 24 may extract the terminating number from the request as indicated at block 104, and interexchange switch 24 may send the extracted information to central database 30. Interexchange switch 24 and central database 30 may communicate using advanced intelligent network (AIN) signaling system 7 (SS7) common channel interoffice signaling (CCIS) techniques or any other suitable communications protocol.

At block 106, central database 30 may receive the query from interexchange switch 24. The query from interexchange switch 24 may include a customer identifier, such as an SS7 originating point code (OPC) for interexchange switch 24 for instance. At block 107, central database 30 may process the request. For instance, central database 30 may translate the OPC into a customer code, and central database 30 may then retrieve termination information associated with both the customer code and the termination number. At block 108, central database 30 may return termination information to interexchange switch 24. The termination information may include the three CTCs and a flag indicating whether the number is a wireless termination, for instance. The termination information may also be referred to as call characteristics. If the termination is wireless, interexchange switch 24 may then set a flag to bill accordingly for call completion, as indicated at blocks 110 and 112.

At block 120, interexchange switch 24 may then determine a preferred routing path for the call, based on the CTCs and the call attributes described above. For instance, routing logic in interexchange switch 24 may be programmed to use different routing paths in different circumstances. For example, interexchange switch 24 may be programmed to use one trunk line for calls to France on weekdays and a second trunk line for calls to France on weekends. Similarly, interexchange switch 24 may be programmed to use a preferred trunk line if that line is available, a first backup line if the preferred line is not available, and a second backup line of the first is not available.

In addition, as described below, the IXC may store CTCs in central database 30 in support of such business rules. For example, the three CTCs may encode identifiers for the three trunk lines in order of preference. Accordingly, interexchange switch 24 may select the CTC to be used, based on call attributes such as the time of the call or trunk line availability. The IXC may even use the control logic in interexchange switch 24 and the CTCs in central database 30 to prevent calls from being completed in certain circumstances. For instance, an IXC may maintain a list of approved foreign cities, and calls to foreign cities that aren't on that list may be aborted with an appropriate message to the caller. For international calls to wireless numbers, IXCs may further automatically provide callers with advance notice that a surcharge for wireless termination may apply, with an option for the caller to abort the call. At block 122, interexchange switch 24 may then use routing instructions or parameters based on the CTCs to complete the call.

As indicated at block 130, database 30 may then determine whether a customer has requested a CTC update. If so, database 30 may receive new CTCs from the customer and save those CTCs in translation table 41, as indicated at blocks 132 and 134. For instance, an IXC may use a workstation to send CTC updates to central database 30.

In the example embodiment, central database 30 stores each set of CTCs in association with a descriptive code and an identifier for the customer that is storing those CTCs. The system thus allows each customer to implement its own custom, interactive routing strategy for different categories of international call, such as calls to particular foreign cities or wireless carriers. For instance, the customer can store CTCs that encode SS7 circuit identification codes (CICs) or global circuit identification codes (GCICs) for alternative trunk routes to be used in different circumstances, trunk group identifiers, or any other types of values selected by the customer. As described above, control logic in interexchange switch 24, for example, can then use the CTCs to dynamically route calls via different trunk carriers in different circumstances to facilitate or effectuate a predetermined routing strategy, such as least cost routing.

After the new CTCs are saved or it is determined that updating has not been requested, the process may then return to block 100, and subsequent calls or requests from interexchange switch 24 may be handled in substantially the same manner.

By providing carriers with termination information as described above, central database 30 allows carriers to recognize wireless termination numbers. Furthermore, central database 30 allows carriers to route international calls more intelligently, even if those calls are destined for wireline termination.

In another aspect of the example embodiment, central database 30 may be used for directory assistance. For instance, a caller with a base number and a city name may call for directory assistance, and central database 30 may be used to provide the proper country code and city code necessary to call that base number. Central database 30 may also be used to advise a caller whether an international number uses wireless termination. Alternatively, a caller could provide the full destination number, with city code and country code, and central database 30 could be used to determine the names of the associated country and city. Such an inquiry may be referred to as a reverse inquiry.

In addition, carriers could use the central database to analyze billing records and generate statistics to help negotiate favorable interconnection agreements. For instance, the statistics could be considered when negotiating an interconnection agreement, so that the agreement accurately reflects actual termination characteristics, such as percentage of terminations carried via wireless. The central database could also be used to facilitate bandwidth trading among carriers and to audit bills to small international providers from backbone carriers.

The example embodiment is described in terms of an IXC obtaining information directly from central database 30; however, the invention is not limited to that specific arrangement. For instance, one or more intermediate entities may participate in the process. For example, a carrier may communicate with a billing services bureau, and the billing services bureau may use central database 30 to obtain termination information for the carrier. For purposes of this documents, the term "support organization" includes the database owner or manager, as well as organizations that use information obtained from the database to provide services for customers, such as billing services bureaus, for example.

In the example embodiment, the database owner will obtain information on a continuous or periodic basis from individual carriers, from foreign regulators, from industry organizations, from international governing bodies, and from national or regional databases for foreign countries. That information may include lists of the telephone numbers or prefixes served by foreign carriers, cities where said numbers reside, carrier names, the type of termination associated with said numbers (wireless or wireline), etc. The database owner may then update the database tables accordingly.

Although the present invention has been described with reference to various example embodiments, those with ordinary skill in the art will understand that numerous variations of those embodiments could be practiced without departing from the scope and spirit of the present invention. For example, one of ordinary skill will appreciate that alternative embodiments could be deployed with many variations in the number and type of switches and other components in the system, the network protocols, the system topology, the distribution of various software and data components among the hardware systems in the network, and myriad other details (e.g., the length of various fields or columns, the number of columns, etc.) without departing from the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, information handling systems incorporating the invention may include personal computers, mini computers, mainframe computers, distributed computing systems, and other suitable devices.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such as wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the embodiments or implementations illustrated herein, but is defined by the appended claims.

What is claimed is:

1. A method for facilitating call routing for an international call, the method comprising:
   receiving initialization information for an international call, wherein the initialization information includes a termination telephone number for the international call;
   in response to receiving the initialization information, automatically retrieving termination information for the termination telephone number from a remote database, based on the termination number and an identifier for an interexchange carrier, wherein the termination information includes a flag indicative of whether the termination telephone number is a wireless termination; and
   in response to retrieving the termination information for the termination telephone number, automatically using the termination information to complete the international call.

2. The method of claim 1, wherein the operation of automatically using the termination information to complete the international call comprises:
   automatically using the termination information from the remote database to determine routing instructions for the international call; and
   automatically routing the international call, based on the routing instructions.

3. The method of claim 1, wherein the operation of receiving the initialization information for the international call comprises receiving the initialization information at an interexchange switch.

4. The method of claim 1, wherein the operation of receiving initialization information for the international call comprises receiving the initialization information from a local exchange carrier.

5. A system for facilitating call routing for an international call, the system comprising:
   an interexchange switch; and
   processing resources in the interexchange switch that perform operations comprising:
   receiving initialization information for an international call, wherein the initialization information includes a termination telephone number for the international call;

in response to receiving the initialization information, automatically retrieving termination information for the termination telephone number from a remote database, based on the termination number and an identifier for an interexchange carrier, wherein the termination information includes a flag indicative of whether the termination telephone number is a wireless termination; and in response to retrieving the termination information for the termination telephone number, automatically using the termination information to complete the international call.

6. The system of claim 5, wherein the operation of automatically using the termination information to complete the international call comprises:

automatically using the termination information from the remote database to determine routing instructions for the international call; and automatically routing the international call, based on the routing instructions.

7. The system of claim 5, wherein the operation of receiving initialization information for the international call comprises receiving the initialization information from a local exchange carrier.

8. A method for facilitating call routing for an international call, the method comprising:

receiving initialization information for an international call at a switch, wherein the initialization information includes a termination telephone number;

in response to receiving the initialization information, automatically obtaining one or more termination characteristics associated with the termination telephone number from a remote centralized database, wherein the remote centralized database contains termination characteristics for telephone numbers outside a North American Numbering Plan (NANP) and wherein the one or more termination characteristics include a flag indicative of whether the termination telephone number is a wireless termination; and in response to obtaining the one or more termination characteristics from the remote centralized database, automatically using at least one of the one or more termination characteristics from the remote centralized database to complete the international call to the termination telephone number.

9. The method of claim 8, wherein:

at least one of the one or more termination characteristics identifies the foreign carrier; and the operation of automatically using at least one of the termination characteristics from the remote centralized database to complete the international call comprises selecting a direct routing path to the identified foreign carrier for the international call.

10. The method of claim 8, further comprising:

receiving information at an interexchange carrier (IXC) about a foreign carrier that provides termination for phone numbers outside the NANP;

generating multiple custom termination codes for the foreign carrier; and transmitting the multiple custom termination codes from the IXC to the remote centralized database, such that the remote centralized database records the multiple custom termination codes as termination characteristics, and such that the remote centralized database associates the multiple custom termination codes with an identifier for the foreign carrier and an identifier for the IXC.

11. The method of claim 8, wherein:

the method further comprises recognizing one or more call attributes for the international call; and the operation of automatically using at least one of the termination characteristics from the remote centralized database to complete the international call comprises automatically selecting a termination characteristic among the one or more termination characteristics for use in completing the international call, based on the one or more recognized call attributes.

12. The method of claim 11, wherein:

the one or more call attributes comprise time of the international call; and the operation of automatically selecting the termination characteristic for use in completing the international call comprises selecting the termination characteristic, based on the time of the international call.

13. The method of claim 11, wherein:

the one or more termination characteristics comprise identifiers for two or more communications channels; and the operation of automatically selecting the termination characteristic for use in completing the international call comprises selecting one of the communications channels, based on communication channel availability.

14. The method of claim 11, wherein:

at least one of the one or more termination characteristics identifies the foreign carrier;

the method further comprises consulting a predefined list of carriers to determine whether the identified foreign carrier is an acceptable carrier; and the operation of automatically selecting the termination characteristic for use in completing the international call comprises utilizing the identified foreign carrier to complete the international call only if the identified foreign carrier is an acceptable carrier.

15. The method of claim 1, further comprising, responsive to the flag indicating that the termination telephone number is a wireless termination, adding a surcharge for call completion to a billing associated with the international call.

* * * * *